(12) United States Patent
Free

(10) Patent No.: US 10,106,707 B2
(45) Date of Patent: Oct. 23, 2018

(54) METHOD FOR PREPARING STRUCTURED ADHESIVE ARTICLES

(71) Applicant: 3M INNOVATIVE PROPERTIES COMPANY, St. Paul, MN (US)

(72) Inventor: Michael Benton Free, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 155 days.

(21) Appl. No.: 14/895,762

(22) PCT Filed: May 20, 2014

(86) PCT No.: PCT/US2014/038691
§ 371 (c)(1),
(2) Date: Dec. 3, 2015

(87) PCT Pub. No.: WO2014/197194
PCT Pub. Date: Dec. 11, 2014

(65) Prior Publication Data
US 2016/0115356 A1 Apr. 28, 2016

Related U.S. Application Data

(60) Provisional application No. 61/831,766, filed on Jun. 6, 2013.

(51) Int. Cl.
*C09J 7/40* (2018.01)
*C09J 7/20* (2018.01)
(Continued)

(52) U.S. Cl.
CPC ........... *C09J 7/403* (2018.01); *B29C 37/0075* (2013.01); *B29C 51/14* (2013.01);
(Continued)

(58) Field of Classification Search
None
See application file for complete search history.

(56) References Cited

U.S. PATENT DOCUMENTS

| 2,736,721 A | 2/1956 | Dexter |
| 3,437,622 A | 4/1969 | Dahl |

(Continued)

FOREIGN PATENT DOCUMENTS

| EP | 0279579 | 8/1988 |
| JP | 7138541 | 5/1995 |

(Continued)

OTHER PUBLICATIONS

Smith, "Modern Optic Engineering", "The Design of Optical Systems", McGraw-Hill, 1966, pp. 104-105.

*Primary Examiner* — Frank D Ducheneaux
(74) *Attorney, Agent, or Firm* — Jeffrey M. Olofson

(57) ABSTRACT

Methods of forming laminating adhesive articles include providing a multi-layer article, and a tool with a structured surface. The multi-layer articles include a substrate, an adhesive layer, and a liner. The multi-layer article is placed between the structured surface of the tool and a support surface that is hard and the tool is embossed against the liner by applying pressure or pressure/heat. The embossing causes the tool structures to distort the liner and the adhesive layer, and causes permanent topological changes in a portion of the adhesive layer, but does not distort the substrate. The distortion in the liner is retained upon release of the applied pressure. The portions of topologically changed adhesive can form convex structures that are permanent. Upon removal of the liner from the adhesive layer, the concave structures on the adhesive layer are unstable, but the convex structures are stable.

9 Claims, 2 Drawing Sheets

(51) Int. Cl.
  *C09J 133/00* (2006.01)
  *C09J 7/38* (2018.01)
  *B32B 38/06* (2006.01)
  *B32B 38/10* (2006.01)
  *B29C 37/00* (2006.01)
  *B29C 51/14* (2006.01)
  *B32B 37/00* (2006.01)
  *B32B 37/02* (2006.01)
  *B29K 105/00* (2006.01)
  *B29L 7/00* (2006.01)

(52) U.S. Cl.
  CPC .......... *B32B 37/0076* (2013.01); *B32B 37/02* (2013.01); *B32B 38/06* (2013.01); *B32B 38/10* (2013.01); *C09J 7/20* (2018.01); *B29K 2105/256* (2013.01); *B29L 2007/001* (2013.01); *C09J 7/38* (2018.01); *C09J 133/00* (2013.01); *C09J 2201/32* (2013.01); *C09J 2201/606* (2013.01); *C09J 2433/00* (2013.01)

(56) References Cited

U.S. PATENT DOCUMENTS

| | | | |
|---|---|---|---|
| 3,718,712 | A | 2/1973 | Tushaus |
| 4,315,047 | A | 2/1982 | Seabold |
| 5,122,902 | A | 6/1992 | Benson |
| 5,141,790 | A | 8/1992 | Calhoun |
| 5,209,971 | A | 5/1993 | Babu |
| 5,214,119 | A | 5/1993 | Leir |
| 5,223,465 | A | 6/1993 | Ueki |
| 5,268,228 | A | 12/1993 | Orr |
| 5,296,277 | A | 3/1994 | Wilson |
| RE34,605 | E | 5/1994 | Schrenk |
| 5,360,659 | A | 11/1994 | Arends |
| 5,579,162 | A | 11/1996 | Bjornard |
| 5,591,820 | A | 1/1997 | Kydonieus |
| 5,882,774 | A | 3/1999 | Jonza |
| 6,049,419 | A | 4/2000 | Wheatley |
| 6,197,397 | B1 | 3/2001 | Sher |
| 6,315,851 | B1 | 11/2001 | Mazurek |
| 7,060,351 | B2 | 6/2006 | Hannington |
| 7,255,920 | B2 | 8/2007 | Everaerts |
| 7,371,464 | B2 | 5/2008 | Sherman |
| 7,655,283 | B2 | 2/2010 | Sherman |
| 7,705,103 | B2 | 4/2010 | Sherman |
| 7,879,419 | B2 | 2/2011 | Stocq |
| 8,124,169 | B2 | 2/2012 | Ylitalo |
| 2006/0188704 | A1 | 8/2006 | Mikama |
| 2007/0212535 | A1 | 9/2007 | Sherman |
| 2007/0212635 | A1 | 9/2007 | Ogama |
| 2011/0123800 | A1 | 5/2011 | Sherman |
| 2011/0316203 | A1 | 12/2011 | Emslander |
| 2012/0100326 | A1 | 4/2012 | Sherman |
| 2012/0141732 | A1 | 6/2012 | Patel |
| 2012/0154811 | A1 | 6/2012 | Pokorny |
| 2012/0270980 | A1 | 10/2012 | Pokorny |

FOREIGN PATENT DOCUMENTS

| | | |
|---|---|---|
| JP | 0729569 | 6/1995 |
| WO | WO 1993-05123 | 3/1993 |
| WO | WO 1994-00525 | 1/1994 |
| WO | WO 1997-18276 | 5/1997 |
| WO | WO 1997-33946 | 9/1997 |
| WO | WO 2000-22059 | 4/2000 |
| WO | WO 2000-69985 | 11/2000 |
| WO | WO 2000-75210 | 12/2000 |
| WO | WO 2002-074877 | 9/2002 |
| WO | WO 2006-080781 | 8/2006 |
| WO | WO 2011-091132 | 7/2011 |
| WO | WO 2014-197194 | 12/2014 |
| WO | WO 2014-197368 | 12/2014 |
| WO | WO 2014-197375 | 12/2014 |
| WO | WO 2014-209592 | 12/2014 |
| WO | WO 2014-209607 | 12/2014 |

METHOD FOR PREPARING STRUCTURED ADHESIVE ARTICLES

CROSS REFERENCE TO RELATED APPLICATIONS

This application is a national stage filing under 35 U.S.C. 371 of PCT/US2014/038691, filed May 20, 2014, which claims priority to U.S. Provisional Application No. 61/831,766, filed Jun. 6, 2013, the disclosure of which is incorporated by reference in its/their entirety herein.

FIELD OF THE DISCLOSURE

This disclosure relates to structured laminating adhesive articles, and methods for making structured laminating adhesive articles, including microstructured laminating adhesive articles.

BACKGROUND

Microstructured adhesive articles have been prepared by applying a flowable pressure sensitive adhesive to the surface of a microstructured release liner or the surface of a microstructured molding tool. The process results in the creation of an adhesive having a microstructured surface. When the resulting articles are dry laminated under pressure to substrates such as glass or polymer films, the microstructural features created in the adhesive surface allow air to escape from the bonding interface, thereby minimizing or preventing the formation of bubbles and pinholes.

During lamination, the microstructural features may flatten out and wet the substrate surface. Typically, applied pressure is used to collapse the structures during lamination and form the adhesive bond. However, this process introduces stresses into the adhesive as the adhesive relaxes and tries to return to its initial microstructured state. These stresses can create defects in the adhesive that adversely affect its adhesive and optical properties.

A variety of techniques have been used to prepare adhesive articles with microstructured surfaces. Typically the adhesive surface is contacted to a structured tool or release liner to form a structured pattern in the adhesive layer. For example, in U.S. Pat. No. 6,315,851 (Mazurek et al.) microstructured pressure sensitive adhesives are formed by molding an adhesive layer against a microstructured tool or a microstructured liner, and in US Patent Publication No. 2006/0188704 (Mikami et al.) fluid egress structures are formed in an adhesive surface by contacting the adhesive to a structured release tool or a structured release liner. Japanese Utility Model Publication 7-29569 (Kawada et al.) describes forming a tack label for a container such as a bottle. The tack label is readily removable from the bottle surface by soaking the bottle in an aqueous solution, because the adhesive contains an uneven shape to form penetration channels permitting fluid entry to the bond line. The labels are formed by contacting an adhesive to a structured release liner, the release liner having been formed by embossing, and then contacting the label material to the exposed adhesive surface. Additionally, in US Patent Publication No. 2007/0212635 (Sherman et al.), a structured adhesive surface is formed by pressing a microstructured tool or release liner to a crosslinked adhesive surface.

U.S. Pat. No. 5,268,228 (Orr), describes a double-sided adhesive-coated foam tape in which the grooves are fine enough that upon bonding the grooves largely or completely disappear. In Japanese Patent Publication 7-138541 (Shimizu), an adhesion process film is prepared with an embossing process to form fine continuous concave grooves.

In addition, several applications have been described in which microstructured adhesive layers have beads or pegs that protrude from the adhesive surface to make the adhesive surface positionable or repositionable upon contact with a substrate surface. U.S. Pat. No. 5,296,277 (Wilson et al.) describes such a system. U.S. Pat. No. 7,060,351 (Hannington), describes an adhesive article that provides air egress, by providing an area of no initial adhesion for the air to flow out from under the construction. In the article, a continuous layer of adhesive is adhered to a surface that has a plurality of spaced-apart non-adhesive material, and the non-adhesive material becomes embedded in the adhesive layer.

SUMMARY

The present disclosure describes structured laminating adhesive articles, and methods for making structured laminating adhesive articles, including microstructured laminating adhesive articles. Structured laminating adhesive articles comprise a substrate with a first major surface and a second major surface, an adhesive layer with a first major surface and a second major surface, where the first major surface of the adhesive layer is contacting the second major surface of the substrate, and a liner with a first major surface and a second major surface, where the first major surface of the liner is contacting the second major surface of the pressure sensitive adhesive layer. The adhesive layer comprises a mixture of adhesive components where the adhesive components have the same chemical composition but different topological properties. The second major surface of the liner contains a plurality of concave structures that correspond to a plurality of concave structures in the pressure sensitive adhesive layer, but the concave structures do not distort the second major surface of the substrate. Additionally, the concave structures in the adhesive layer are unstable upon the removal of the liner. In some embodiments, the adhesive layer may further comprise a plurality of convex structures adjacent to the concave structures. These convex structures comprise an adhesive composition which has been permanently topologically distorted.

Also described are methods of forming articles, including laminating, and laminated articles. Methods of forming laminating articles comprise providing a multi-layer article, and providing a tool with a structured surface. The multi-layer article comprises a substrate with a first major surface and a second major surface, a pressure sensitive adhesive layer with a first major surface and a second major surface, where the first major surface of the pressure sensitive adhesive layer is contacting the second major surface of the substrate, and a liner with a first major surface and a second major surface, where the first major surface of the liner is contacting the second major surface of the pressure sensitive adhesive layer. The method further comprises placing the multi-layer article between the structured surface of the tool and a support surface to form a construction, such that the first major surface of the substrate is in contact with the support surface, applying pressure or a combination of pressure and heat to the construction such that at least some of the structures on the surface of the tool distort the liner and the pressure sensitive adhesive layer but does not distort the second major surface of the substrate. The support surface comprises a hard support surface. The distortion in the liner is retained upon release of the applied pressure. The method can further comprise separation of the liner from the pressure sensitive adhesive layer such that the structures on the pressure sensitive adhesive layer are unstable, but do not immediately collapse. The pressure sensitive adhesive layer can be contacted to an adherend surface to form a pressure sensitive adhesive laminate.

BRIEF DESCRIPTION OF THE DRAWINGS

The present application may be more completely understood in consideration of the following detailed description of various embodiments of the disclosure in connection with the accompanying drawings.

Figure 1:
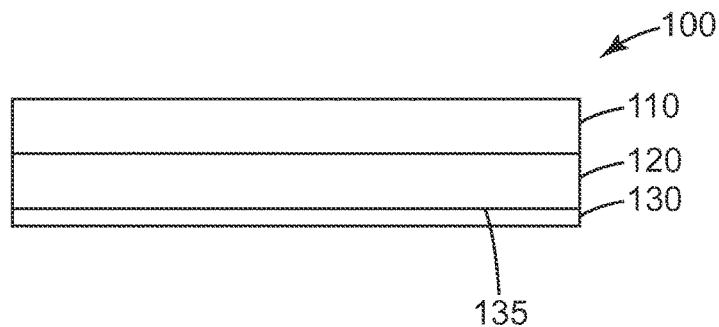
FIG. 1 shows cross sectional views of a multi-layer adhesive article prior to embossing according to one embodiment of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The use of adhesive articles with structured surfaces, especially microstructured surfaces is increasing. These structured surfaces may be temporary features, meaning that the structures are designed to eventually disappear, or permanent features, meaning that the structures are not designed to disappear. Permanently structured adhesive surfaces are generally formed to control the adhesive properties of the adhesive layer, such as making the adhesive layer repositionable (as described, for example, in U.S. Pat. No. 6,315,851 (Mazurek et al.)) or to control the physical properties of the adhesive layer, such as for example to build in pillows of air to the adhesive layer to make the adhesive layer cushioning (as described, for example, in PCT Publication No. 97/33946 (Hata)). It is more typical, however, for adhesive layers to have structured surfaces that are temporarily structured.

There are numerous advantages to using adhesive articles with temporarily structured surfaces. Sometimes these adhesive articles are described as "laminating adhesive articles", since upon lamination the structures at least partially disappear. One such advantage is air egress from the bond line. When an adhesive bond is formed, the adhesive surface is contacted to an adherend surface. When this contact is made, air can become trapped between the adhesive layer and the adherend surface, causing bubbles or other defects to form in the bond line, the line along which the two surfaces are joined together. This is particularly true when dealing with adherends that are rigid and semi-rigid substrates, but is also true when dealing with flexible substrates. This is particularly true with articles that are hand-laminated, as the lamination is subject to variability based upon operator experience and skill. These defects not only affect the adhesion of the adhesive layer to the adherend surface, but also affect the aesthetic appearance of the bond line and in the case of optical articles can ruin the formed article. In optical articles in which light travels through the adhesive layer, the presence of air bubbles and similar defects can greatly affect the optical properties such as light transmission, clarity, and haze and can make the bond line unacceptable, and can impact the viewing experience. To prevent these defects, a structured adhesive surface is often used. Generally, these structures are microstructures. During lamination, the microstructural features flatten out, thereby wetting the adherend surface, and forming a bond to the adherend surface. In the course of lamination, air bleeds out through the microstructural features to minimize or prevent the formation of bonding defects. The air egress feature is particularly important when dealing with lamination to rigid adherends, especially rigid-to-rigid lamination or where the object to be laminated is relatively large. Currently used methods to prevent defects in such laminations include techniques such as coating the adhesive layer with water or a water-detergent solution to prevent bubble formation during lamination. These techniques require removal of the water by evaporation. Bubble formation is particularly unacceptable in optical applications.

A variety of techniques for creating a temporarily structured adhesive surface have been developed. In some instances the adhesive layer surface is contacted to the surface of a structured tool. This process of pressing a structured tool to an adhesive surface is typically referred to as embossing in the adhesive art. The inverse of the pattern of the tool surface is formed in the adhesive surface. Upon removal of the structured tool a structured adhesive surface is generated. When this technique is used, the adhesive layer is generally contacted to an adherend soon after removal of the structured tool, such as in a continuous in-line process. In a closely related technique, a structured release liner is contacted to the adhesive surface. The structured release liner is similar to a structured tool in that it also has a structured pattern present on its surface. However, unlike a structured tool, the structured release liner generally is designed to remain in contact with the adhesive layer to form a laminate construction. The structured release liner remains in contact with the adhesive layer until it is desired to laminate the adhesive layer to an adherend, at which time the liner is removed to reveal the structured surface. An advantage of this technique is that because the liner remains adhered to the adhesive surface, it protects the structured surface until the adhesive layer is to be used.

Another technique involves coating an adhesive precursor composition to a structured tool or release liner. This adhesive precursor composition may be an adhesive solution, dispersion or a flowable 100% solids composition or it may contain reactive components that form an adhesive upon curing. Curing in this context is meant to merely mean polymerization and may or may not involve crosslinking.

Upon coating of the adhesive precursor composition to the structured tool or release liner, the composition is dried, cooled or cured to form an adhesive layer in contact with the structured tool or release liner. Upon removal of the structured tool or release liner, a structured adhesive surface is exposed as described above.

Typically, structured release liners are prepared by embossing. This means that the release liner has an embossable surface which is contacted to a structured tool with the application of pressure and/or heat to form an embossed surface. This embossed surface is a structured surface. The structure on the embossed surface is the inverse of structure on the tool surface, that is to say a protrusion on the tool surface will form a depression on the embossed surface, and a depression on the tool surface will form a protrusion on the embossed surface.

In all of these techniques, the structuring agent, whether a structured tool or a structured release liner, is contacted directly to the surface of the adhesive. In this disclosure, methods are described for forming a structured surface on the surface of an adhesive layer by embossing through a liner. Rather than a structured liner being contacted to the adhesive layer, a multi-layer construction comprising an adhesive layer and a liner is embossed with a structured tool to impart a structure to the liner and the adhesive layer. In this way the advantages of having the structures of a structured adhesive layer protected by a structured liner until use is achieved without having to pre-form a structured liner.

An additional advantage of the techniques described in the present disclosure is that the embossing processed described generates two types of structures. One set of structures are temporary and tend to disappear upon removal of the liner in contact with the adhesive layer. The second set of structures are permanent and do not tend to disappear upon removal of the liner in contact with the adhesive layer, but rather constitute a permanent change in portions of the surface of the adhesive layer. These permanent changes in portions of the surface of the adhesive layer are effected not by changing the composition of the adhesive layer (such as for example by selective crosslinking in those portions, or selective tackification in those portions) or by adding a new composition or particle to those portions (such as, for example, printing a different composition onto the adhesive layer at selected portions to modify the composition at those locations). Rather, the embossing process changes the topological properties of the adhesive. Thus, the embossing process is not only able to prepare an adhesive layer with a structured surface, it produces an adhesive layer with temporary structures that provide air egress channels and also permanent structures which provide locations with a different level of adhesion from the bulk of the adhesive surface.

Regarding the temporary structures, the initial state for the adhesive layer is the state to which it wants to return if no stresses are applied to it. The embossing step produces a structured surface in both the liner and the adhesive layer and thus builds stress into the adhesive layer. Upon removal of the liner, the adhesive layer wants to return to its initial state, in other words it wants to return to being flat. This is in contrast to structured adhesive layers that have an initial state that is structured, such as adhesive layers that are coated onto a structured liner and either cured, dried (if solvent or water borne), or allowed to cool (if hot melt processed). Structured adhesive layers that are coated onto a structured liner tend to be stable, meaning the structures do not tend to collapse, upon removal of the liner. In the present disclosure, however, the structures formed in the adhesive layer are unstable upon removal of the liner. By the structures being unstable, it is meant that the adhesive structures spontaneously collapse and wet out a surface to which the adhesive layer is contacted without the need to apply pressure or heat. Typically, the collapse of the structures is slow enough to give the handler time to laminate the adhesive layer to an adherend, but quickly enough so that adhesive strength builds upon lamination without the need for applied pressure. Typically, complete collapse of the structures is observed within 30 days, more typically 10 days, or even less. Thus, unlike systems where an adhesive layer is coated or laminated to a structured liner making the structured state the unstressed configuration for the adhesive layer, in this instance the unstressed configuration for the adhesive layer is flat, and the structured configuration is the stressed configuration, and this stress built into the adhesive layer is relieved by the collapse of the structures and a return to the flat configuration.

Regarding the permanent structures, it is believed that the stress built into the adhesive layer during the embossing step, can under certain conditions of temperature and pressure and when a rigid supporting structure is used, in localized areas overcome the viscoelastic response of the adhesive and thus change the topological properties of the adhesive in those localized areas. This results in localized areas of permanently deformed adhesive, with the permanently deformed adhesive having changed topological properties. If the adhesive layer, which is a viscoelastic material, is viewed as an array of springs, the localized areas with permanently deformed adhesive can be viewed as springs that have been overstretched such that they cannot spring back any longer. The material composition of the springs has not been changed, but the topological property (springiness) has been changed. Similarly, when permanent deformation is effected within localized areas of an adhesive layer, the material composition of the localized areas is not changed but the topological properties are changed.

The regions of permanent deformation of the adhesive layer can complement the areas of temporary deformation to decrease the initial adhesion of the adhesive layer. This decreased initial adhesion permits the repositioning of the adhesive layer. In other words, the adhesive layer can be removed fairly easily from the surface of the adherend to which it is attached (the adhesive bond is weak). Over time, as the temporary structures collapse, the strength of the adhesive bond increases, but the regions of permanent deformation continue to provide repositionability. Because the deformations are permanent, they can provide a way to form small pockets of air between the adhesive layer and adherend surface. While typically the presence of air pockets between the adhesive layer and adherend surface are considered detrimental, if the air pockets are kept very small and controlled in size they can provide useful properties such as optical properties such as diffusive properties.

An array of air pockets that are kept small can provide small zones where there is a large difference in refractive index since the refractive index of air is very different from that of the adhesive layer. This difference in refractive index can efficiently scatter light, much as adding beads with a refractive index different from the adhesive layer would. However, unlike beads, the air pockets are not rigid and thus will not abrade surfaces in which it comes into contact, and being located between the surface of the adhesive layer and an adherend, the air pockets are embedded and thus protected. One example of an article where such diffusive air pockets are desirable, are in display devices that use backlights. In order to avoid spots of intense brightness, diffusers are often used with backlit devices to diffuse the light. The use of adhesive articles of this disclosure can eliminate the need for the addition of a separate diffuser element.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. As used herein, the term "adherend" refers to any surface to which an adhesive layer can be attached, such as the surface of a substrate, a film, etc. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "release liner", used interchangeably with the term "liner", refers to a thin flexible sheet which after being placed in intimate contact with an adhesive surface may be subsequently removed without damaging the adhesive coating.

As used herein, the term "structured liner" refers to a liner with a structured surface, and the term "microstructured liner" refers to a liner with a microstructured surface.

As used herein, the term "backing" refers to a thin, flexible sheet which, after being placed in intimate contact with an adhesive cannot be subsequently removed without damaging the adhesive coating.

As used herein, the term "microscopic" refers to features of small enough dimension so as to require an optic aid to the naked eye when viewed from any plane of view to determine its shape. One criterion is found in Modem Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

As used herein, the term "microstructure" means the configuration of features wherein at least 2 dimensions of the features are microscopic. The topical and/or cross-sectional view of the features must be microscopic.

As used herein, the term "topological properties" has its normal geometric meaning, and refer to properties that are preserved under continuous deformations including stretching and bending. The expression "a change in topological properties" refers to an altering of the properties that are preserved under stretching and bending, so that when a process causes a change in topological properties of a material, the material is compositionally the same, but has a different response to stretching and bending than it had before the process that caused the change.

The terms "glass transition temperature" and "$T_g$" are used interchangeably. Typically $T_g$ values are measure using Differential Scanning calorimetry (DSC) unless otherwise noted.

The term "room temperature" refers to ambient temperature, generally 20-22° C., unless otherwise noted.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance over at least a portion of the visible light spectrum (about 400 to about 700 nm).

Unless otherwise indicated, "optically clear" refers to an adhesive or article that has a high light transmittance over at least a portion of the visible light spectrum (about 400 to about 700 nm), and that exhibits low haze.

The term "wavelength of visible light" as used herein encompasses the wavelengths of the light spectrum that constitutes visible light (about 400 to about 700 nm).

Unless otherwise indicated, "self wetting" refers to an adhesive which is very soft and conformable and is able to be applied with very low lamination pressure. Such adhesives exhibit spontaneous wet out to surfaces.

Refractive index is defined herein as the absolute refractive index of a material (e.g., a monomer or the polymerized product thereof) which is understood to be the ratio of the speed of electromagnetic radiation in free space to the speed of the radiation in that material, with the radiation being of sodium yellow light at a wavelength of about 583.9 nanometers (nm).

The refractive index can be measured using known methods and is generally measured using an Abbe Refractometer.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —$CH_2CH_2(OCH_2CH_2)$—$OCH_2CH_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The terms "free radically polymerizable" and "ethylenically unsaturated" are used interchangeably and refer to a reactive group which contains a carbon-carbon double bond which is able to be polymerized via a free radical polymerization mechanism.

As used herein, "temporarily repositionable" refers to the ability to be adhered to and removed from an adherend without substantial loss of adhesion capability. However, over time the adhesive bond strength builds. This is in contrast to adhesives that are "repositionable" which refers to the ability to be repeatedly adhered to and removed from a adherend without substantial loss of adhesion capability and the adhesive does not develop excessive adhesion build-up over time.

Disclosed herein are multi-layer articles comprising a substrate, an adhesive layer and a liner. Typically the adhesive layer comprises a pressure sensitive adhesive layer. The articles comprise a substrate with a first major surface and a second major surface, an adhesive layer with a first major surface and a second major surface, where the first major surface of the adhesive layer is contacting the second major surface of the substrate, and a liner with a first major surface and a second major surface, where the first major surface of the liner is contacting the second major surface of the adhesive layer. The adhesive layer comprises a mixture of adhesive components, the adhesive components having the same chemical composition but different topological properties (topological properties have been described above). The second major surface of the liner contains a plurality of concave structures that correspond to a plurality of concave structures in the second major surface of the adhesive layer, but the concave structures do not distort the second major surface of the substrate. In other words, a series of concave structures are present in the liner and continue into the adhesive layer, but do not continue into the substrate.

Typically, the difference in topological properties within the adhesive is a difference in viscoelastic response. Adhesive compositions are viscoelastic, meaning they have properties both of elastic materials (such as rubber bands) and viscous fluids (such as honey). An effect of the viscoelastic nature of adhesives is their ability to wet out surfaces. In the articles of this disclosure, the adhesive layer contains majority regions that are able to effectively wet out surfaces and other minority regions that are not able to effectively wet out surfaces, because the topological properties of the adhesive have been altered. As described above, if the adhesive layer is viewed as an array of springs, the majority of the adhesive layer contains springs that retain their springiness, whereas the minority regions contain springs that have been overstretched and have lost their springiness. This variability of properties across the surface of the adhesive layer is achieved without changing the material composition of the adhesive layer. In other words, the adhesive layer has the same material composition, but different segments of the adhesive layer have differing topological properties. Besides the difference in the ability to wet out a surface, the different in viscoelastic response can also manifest in other measurable properties such as, for example, peel adhesion.

A wide variety of structures are possible for the concave structures in the articles of this disclosure. The structures may have a wide variety of shapes and sizes. In some embodiments, the concave structures are concave microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

Typically, the embossing process, which is described in greater detail below, provides not only the concave structures described above, but also smaller convex structures. These convex structures contain the adhesive that has been permanently deformed. While not wishing to be bound by theory, it is believed that when the embossing tool contacts the liner and the adhesive layer, a portion of the adhesive is displaced by the volume of the tool. Under the proper conditions of temperature and pressure, this displacement is so vigorous that it causes a permanent change in the adhesive, namely it reduces the viscoelastic response of the adhesive in the regions where the adhesive is displaced (to use the analogy used above, the spring is overstretched and loses its springiness). The displaced adhesive, needing to occupy new space, forms small convex protrusions from the adhesive surface. Generally, small convex protrusions appear adjacent to either side of the convex structures formed by the embossing tool (when viewed at a cross section). The convex structures, unlike the concave structures, are not unstable upon removal of the liner.

A wide variety of substrates are suitable in the articles of this disclosure, provided they can be processed using the methods described below. Particularly suitable substrates include films, tape backings, graphic articles, plastic articles, wound dressings, protection films or tapes, rigid or semi-rigid plates or sheets, or release liners.

Examples of films include a wide range of polymeric films prepared from a variety of materials and of a wide range of thicknesses. Particularly suitable films are optical films, discussed in greater detail below. The films may be of a single layer or multi-layer construction. Other examples of suitable films include barrier films, solar films such as light redirecting films, and electronic films such as electrically conductive films. Examples of polymeric films include films comprising one or more polymers such as cellulose acetate butyrate; cellulose acetate propionate; cellulose triacetate; poly(meth)acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; silicone-based films; and polyolefins including polyethylene and polypropylene such as cast and biaxially oriented polypropylene. The film may be primed or treated to impart some desired property to one or more of its surfaces. Examples of such treatments include corona, flame, plasma and chemical treatments.

Examples of tape backings include a wide range of materials including polymeric films such as those described above, metal films, paper, creped paper, foams and the like. The tape backings may be opaque, optically transparent, or optically clear depending upon the desired use for the tape. The tape backing may be single layer or a multi-layer construction.

Examples of graphic articles include a wide variety of articles that contain a graphic image. Often graphic articles are multi-layer articles and may contain multiple layers of films, metal or metal oxide layers, adhesives, etc. Examples of graphic articles include decorative films, bumper stickers, decals, display films, and the like.

Examples of plastic articles include, for example, plastic sheets and plates, such as for example, the relatively thick polycarbonate sheets used as supporting layers for multi-layer articles such as screen protectors.

A wide variety of wound dressings are suitable substrates. The wound dressings may include a wide variety of materials including films, elastomeric materials, support materials such a cloth, fabric, or non-woven webs, absorbent materials such as hydrogels, and antibacterial agents.

Examples of suitable protection films or tapes include film constructions that contain reinforcing layers such as hurricane-resistant window films, and protective films with conductive elements to protect electronic components by dissipating electrical charges. Other examples of protection films and tapes, include, for example, paint protection films which are applied to vehicles such as automobiles, subways, buses, airplanes and the like to protect the paint from damage from rock chips. Similar protection films are used on wind turbine blades and helicopter blades to protect the surface from damage and reduce the wind resistance of the surface.

Examples of rigid and semi-rigid plates and sheets include a wide range of optical substrates. As used herein, the term "optical substrate" refers to a substrate that can be used to produce an optical effect. The substrate can be any suitable thickness. The optical substrates often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Examples of plates include a wide array of optically clear materials. Examples of suitable plates include a variety of glasses or from polymeric materials such as polycarbonate or polymethyl methacrylate. The plates may have a wide variety of coatings on them such as, for example, tinted coatings, anti-reflection coatings, and anti-glare coatings. Sheets are similar to plates but generally are thinner and less rigid than plates. Examples of sheets include, for example, optically clear semi-rigid substrates of glass or other optically clear materials that are 25-100 micrometers in thickness.

The substrate may also comprise a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. Other exemplary release liners are those described in US Patent Publication No. 2011/0316203 (Emslander et al.). The liner can have a microstructure on its surface that is imparted to the adhesive to form a microstructure on the surface of the adhesive layer.

One particularly suitable class of substrates are optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of anti-microbial coatings include those described in U.S. Pat. No. 8,124,169

(Ylitalo et al.) which describe an antimicrobial coating system that includes a film-forming composition and an effective amount of an antimicrobial agent dispersed within the film-forming composition.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

As discussed above, typically the adhesives are pressure sensitive adhesives. A wide variety of pressure sensitive adhesives are suitable. Examples of each of these classes of adhesives are described below.

Among the pressure sensitive adhesive useful in the articles of this disclosure are those based on natural rubbers, synthetic rubbers, styrene block copolymers, polyvinyl ethers, acrylics, poly-α-olefins, silicones, urethanes or ureas. In many embodiments, the pressure sensitive adhesives are self wetting. Self wetting refers to adhesives which are very soft and conformable and are able to be applied with very low lamination pressure. Such adhesives exhibit spontaneous wet out to surfaces.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive.

Another useful class of pressure sensitive adhesives is synthetic rubber-based adhesives. Such adhesives are generally rubbery elastomers, which are either self-tacky or non tacky and require tackifiers. Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, generally comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL I60D" and "LUTANOL I 65D"; methacrylate/vinyl isobutyl ether/acrylic acid such as "ACRONAL 550 D", available from BASF.

Acrylic pressure sensitive adhesives generally have a glass transition temperature of about 20° C. or less, more typically 0° C. or less and may comprise from 100 to 80 weight percent of a $C_3$-$C_{12}$ alkyl ester component such as, for example, isooctyl acrylate, 2-ethylhexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Typically, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co.

Poly-α-olefin pressure sensitive adhesives, also called a poly(1-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu et al.). The poly-α-olefin polymer may be self tacky and/or include one or more tackifying materials. In addition, the polymer generally is predominantly amorphous. Useful poly-α-olefin polymers include, for example, $C_3$-$C_{18}$ poly(1-alkene) polymers, generally $C_5$-$C_{12}$ α-olefins and copolymers of those with $C_3$ and more typically $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir et al.). One particularly suitable class of silicone pressure sensitive adhesives is the silicone polyoxamide-based pressure sensitive adhesives. These materials are described in, for example, U.S. Pat. No. 7,371,464 (Sherman et al.), and U.S. Pat. No. 7,705,103 (Sherman et al.).

Polyurethane and polyurea pressure sensitive adhesives useful in the invention include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.). Additionally, the urea-based pressure sensitive adhesives described in US Patent Publication No. 2011/0123800 (Sherman et al.) and the urethane-based pressure sensitive adhesives described in US Patent Publication No. 2012/0100326 (Sherman et al.) may be particularly suitable.

In some embodiments, the pressure sensitive adhesive comprises an optically clear pressure sensitive adhesive. Examples of suitable optically clear pressure sensitive adhesives include those based on natural rubbers, synthetic rubbers, styrene block copolymers, polyvinyl ethers, acrylics, poly-α-olefins, silicones, urethanes or ureas. Examples of each of these classes of pressure sensitive adhesives are described above.

One particularly suitable class of optically clear pressure sensitive adhesives are (meth)acrylate-based pressure sensitive adhesives and may comprise either an acidic or basic copolymer. In many embodiments the (meth)acrylate-based pressure sensitive adhesive is an acidic copolymer. Generally, as the proportion of acidic monomers used in preparing the acidic copolymer increases, cohesive strength of the resulting adhesive increases.

To achieve pressure sensitive adhesive characteristics, the corresponding copolymer can be tailored to have a resultant glass transition temperature (Tg) of less than about 0° C. Particularly suitable pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

In some embodiments, it is desirable to use (meth)acrylate monomers that are free of alkoxy groups. Alkoxy groups are understood by those skilled in the art.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer. Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and the like, and mixtures thereof. Due to their availability, typically ethylenically unsaturated carboxylic acids are used.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethylhexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethylhexyl acrylate or n-butyl acrylate composition.

Another useful class of optically clear (meth)acrylate-based pressure sensitive adhesives are those which are (meth)acrylic block copolymers. Such copolymers may contain only (meth)acrylate monomers or may contain other co-monomers such as styrenes. Examples of such pressure sensitive adhesives are described, for example in U.S. Pat. No. 7,255,920 (Everaerts et al.).

In some embodiments, it may be desirable for the adhesive layer to be a crosslinked pressure sensitive adhesive as taught in US Patent Publication No. 2007/0212535 (Sherman et al.). Embossing the surface of a crosslinked pressure sensitive adhesive to create a microstructured adhesive surface minimizes the formation of stresses within the adhesive after lamination because both the pre-structured and final states of the adhesive are substantially planar. Therefore, the structure is unstable when not in contact with the microstructured liner or molding tool. This is in contrast to microstructured adhesives produced by coating a flowable adhesive onto a microstructured release liner or a microstructured molding tool, where the initial state of the adhesive to which it tries to return is that of the microstructured configuration, while the final state is substantially planar.

The adhesive layer can be any suitable thickness as long as the adhesive layer is thicker than the size of the microstructures embossed into the adhesive layer. In general, the thickness ranges from 10 micrometers (about 0.4 mils) to 1500 micrometers (about 60 mils). More typically the adhesive is generally 25 micrometers (about 1 mil) to 51 micrometers (about 2 mils) thick.

The adhesive layer may be continuous or discontinuous. Discontinuous adhesive layers can have a variety of configurations, including random distributions or patterned distributions. Among suitable patterned distributions are stripes (either straight or wavy) and dots (in a variety of shapes and sizes). When the adhesive layer is discontinuous, it is desirable that the adhesive layer be present in those locations where the embossing tool contacts the release liner to ensure that the embossing tool imparts the structure to the adhesive layer. Additionally, the adhesive layer, whether continuous or discontinuous, can be a segmented adhesive layer. A segmented adhesive layer is one that contains segments which contain different adhesive compositions. A segmented adhesive layer is different from an adhesive blend, in and adhesive blend, a single adhesive composition comprises a mixture of different adhesive components. In a segmented adhesive layer, different segments of the adhesive layer comprise different compositions. The discontinuous adhesive layer or segmented adhesive layer can be prepared through the use of a variety of different coating techniques, for example, stripe coating or a variety of different printing techniques.

Particularly suitable adhesive compositions are the optically clear silicone polyoxamide-based pressure sensitive adhesives, optically clear (meth)acrylate-based pressure sensitive adhesives, and crosslinked pressure sensitive adhesives such as those described in US Patent Publication No. 2007/0212535 (Sherman et al.).

The articles of this disclosure also include a liner, often times referred to as a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. Typically, the liner has a thickness of from 25 micrometers (1 mil) to 127 micrometers (5 mils), more typically from 25 micrometers (1 mil) to 84 micrometers (3.3 mils).

In some embodiments, the liner is a separately formed article and in other articles the adhesive layer and liner, or even the substrate, adhesive layer, and liner are all generated simultaneously by coextrusion. In this process, separate molten polymeric streams are contacted to form the multi-layer article. Particularly suitable are the coextruded release liners described in US Patent Publication No. 2011/0316203 (Emslander et al.). In these liners, the release layer comprises a release agent. The release layer may also comprise other polymers, blended with the release agent. Typically, the release agent comprises copolymers of ethylene and alpha-olefins having from 3 to about 10 carbon atoms and density no greater than 0.91 g/cc. Suitable alpha-olefins include 1-butene, 1-hexene, 1-octene, and combinations thereof. Copolymers of ethylene and octene-1 are particularly suitable for use with acrylate-based pressure sensitive adhesives. The copolymers may be either block copolymers or non-block copolymers. In some embodiments, the copolymer has a density of no greater than 0.91 g/cc, for example, no greater than 0.89 g/cc. Suitable copolymers are commercially available from Dow Chemical Company, Midland, Mich., under the tradename "INFUSE" and from Exxon-Mobil Chemical Company, Houston, Tex., under the tradename "EXACT". In some embodiments, the copolymer is polyolefin polymer made using a metallocene catalyst.

As stated above, the release agent may additionally be blended with other polymers to form the release layer. Examples of the polymers useful for blending with the release agent include other polyolefin polymers having a density of no greater than 0.91 g/cc; polyethylene (including low density polyethylene), polydiorganosiloxane polyoxamide copolymers, polypropylene and those polymers sold under the trade names "NUCREL", "BASELL HL 456J", "VISTAMAX", "BYNEL", and combinations thereof.

Also described are methods for forming articles. The methods include providing a multi-layer article and providing a tool with a structured surface. The multi-layer article comprises a substrate with a first major surface and a second major surface, an adhesive layer with a first major surface and a second major surface, where the first major surface of the adhesive layer is contacting the second major surface of the substrate, and a liner with a first major surface and a second major surface, where the first major surface of the liner is contacting the second major surface of the adhesive layer. Examples of suitable materials for each of the components of the multi-layer article are described above.

The structured tool is an implement for imparting a structure or finish to a surface and which may be continuously reused in the process. Typically, the structured tool is a molding tool. Structured molding tools can be in the form of a planar stamping press, a flexible or inflexible belt, or a roller. Furthermore, molding tools are generally considered to be tools from which the structured pattern is generated in the surface by embossing, coating, casting, or platen pressing and do not become part of the finished article. In many embodiments, the structured tool is a microstructured tool, meaning that the tool has a microstructured pattern on its surface.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in U.S. Pat. No. 5,122,902 (Benson). The tools may be prepared from a wide range of materials including metals such as nickel, copper, steel, or metal alloys, or polymeric materials.

The multi-layer article is placed between the structured surface of the tool and a support surface to form a construction. In this construction, the support surface is in contact with the substrate, and the liner is in contact with the structured surface of the tool.

Pressure is applied to the construction comprising the support surface, multi-layer construction, and structured tool, and is then released. The applied pressure causes at least some of the structures on the surface of the tool to distort the liner and the adhesive layer but does not distort the second major surface of the substrate. A portion of the adhesive layer is permanently distorted. Also, the distortion in the liner is retained upon release of the applied pressure, such that a permanent change is made in the liner. In some embodiments, it may be desirable for a combination of heat and pressure to be applied.

As described above, the application of pressure, or a combination of pressure and heat during the embossing process causes a permanent distortion in a portion of the adhesive layer. While not wishing to be bound by theory, it is believed that when the embossing tool contacts the liner and the adhesive layer, a portion of the adhesive is displaced by the volume of the tool. Under the proper conditions of temperature and pressure, this displacement is so vigorous that it causes a permanent change in the adhesive, namely it reduces the viscoelastic response of the adhesive in the regions where the adhesive is displaced (to use the analogy used above, the spring is overstretched and loses its springiness). The displaced adhesive, needing to occupy new space, forms small convex protrusions from the adhesive surface. Generally, small convex protrusions appear adjacent to either side of the convex structures formed by the embossing tool (when viewed at a cross section). The convex structures, unlike the concave structures, are not unstable upon removal of the liner.

Another way of looking at this process is that the embossing process forcibly displaces some of the adhesive and in the process changes the topological properties of that adhesive. Because this displaced adhesive retains its mass, the mass needs to go somewhere where the embossing tool is not applying pressure to the adhesive layer. The adhesive typically moves to the interface between the adhesive and the liner and forms a convex protrusion. This convex protrusion forms at the perimeter of the structured member of the tool. Thus when viewed at a cross section, convex protrusions appear adjacent to the concave structures. The material present in these convex protrusions are compositionally the same as the rest of the adhesive layer, but because of the stresses placed on the adhesive material by the embossing process, the topological properties of the adhesive material is changed. Again, not wishing to be bound by theory, it is believed that the compressive forces of the embossing process so compresses the adhesive material that it changes the topological properties of the adhesive material. The fact that the convex protrusions from the adhesive layer are small relative to the concave structures imparted in the adhesive layer implies that the mass of adhesive that was displaced was also compressed. If the adhesive mass that was displaced was only displaced and not compressed, one would anticipate that the convex protrusions would be more similar in size to the concave structures imparted to the adhesive layer.

Another factor, besides the pressure and temperature of the embossing construction, that can affect the permanent deformation of a portion of the adhesive layer is the speed of embossing. Because the adhesive is a viscoelastic construction, if the stress of embossing is applied relatively slowly, the viscoelastic material is better able to spread out much of the stress of embossing and thus limit the amount of permanent deformation that occurs. Conversely, if the stress of embossing is applied relatively rapidly, the viscoelastic material is less able to spread out the stress of embossing and the stress is more localized and causes more deformation.

Another feature of the permanent deformation of the adhesive layer that has been observed is that it is a localized phenomenon. By this it is meant that only a small portion of the adhesive layer is deformed and has its topological properties changed. The bulk of the adhesive layer remains unchanged topologically after the embossing process. Once again not wishing to bound by theory, it is believed that the viscoelastic nature of the adhesive layer permits it to spread much of the stress induced upon by the embossing throughout the bulk of the adhesive layer and thus only very localized permanent deformations are formed and these near the segments where the embossing tool contacts the liner and adhesive. The elastic component of viscoelastic materials allows them to recover after being stressed, much as a rubber band can be stressed and will return to its original condition upon release of the stress. However, if the viscoelastic material is stressed beyond its ability to recover, a permanent change is made in the topological properties of the material.

Thus a variety of factors control the amount of permanent deformation of the adhesive layer that occurs, or whether the permanent deformation occurs at all. In co-pending application Attorney Docket No. 72396US002 titled "Method For Preparing Structured Adhesive Articles", filed on the same day as the present disclosure, a similar embossing process is described in which the permanent deformation of a portion of the adhesive layer is not observed.

Among the factors that control the amount of permanent deformation of the adhesive layer are the nature and composition of the adhesive layer, the size and shape of the embossing tool elements, the pressure applied to the embossing construction, the temperature applied to the embossing construction, the speed at which the embossing occurs, and the properties of the support surface, especially the hardness. While all of the above factors play a role, it is believed that the properties of the support surface, especially the hardness of the support surface, are particularly important. Typically, the support surface is a hard surface, the hard surface being prepared from a hard material such as a metal or other suitable hard material.

The nature of the support surface depends upon the method used to prepare the structured articles. If a batch process is used, utilizing for example a platen press, the support surface typically is metal or other hard substance. If a continuous process is used, such as for example passing the article film between two rollers, one roller is the structured tool and the other roller is the support surface. When the support surface is a roller, a variety of rollers with a relatively hard surface are suitable. Examples of suitable support rollers include metal rollers as well as rollers prepared with low durometer materials (materials with a hardness of between 50 Shore A and 100 Shore A) with a hard outer layer such as a metal coating or a metal sleeve.

While a wide range of processing conditions are suitable, generally the applied pressure is in the range of 5 kN/cm (kiloNewtons per centimeter) to 100 kN/cm, or 5 to 60 kN/cm, or even 5 to 50 kN/cm. The temperature can be varied from room temperature to 200° C., or room temperature to 150° C., or even 100 to 150° C. The speed of embossing is generally determined by the apparatus used to carry out the embossing. For example, in a continuous process where the multi-layer adhesive article is passed between two rollers to provide the embossing, the speed of embossing can be controlled by the speed that the multi-layer adhesive article is passed between the two rollers. In a batch process, such as one where a platen press or similar apparatus is used, the speed of embossing can be controlled by controlling the speed of the press.

The construction comprising the support surface, multi-layer construction, and structured tool may be together for a relatively long time or a relatively short time. For example, if a platen press is used to prepare the article, the support surface may be the support bed of the press, and the structured tool may be the platen or a tool may be attached to the platen. In other embodiments, the support surface may be flat roller, and the tool may be a roller with a structured surface, and the multi-layer article may be passed between the rollers. Thus the process of simultaneously embossing a pattern onto the adhesive layer and the liner can be done in a batch wise process, a semi-continuous process or a continuous process. In a batch wise process, the multi-layer article is placed in an apparatus such as a platen press, the pressure is applied through the platen that is either a structured tool or has a structured tool attached to it, pressure is released and the embossed multi-layer article is removed. In a semi-continuous process, instead of a discrete multi-layer article, the multi-layer article is a continuous web. The web can then be drawn into the press, pressed, and drawn out of the press. Additionally, a series of presses could be used to press multiple regions of the web at a time. An example of a continuous process is the use of rollers. The multi-layer article can be fed between a pair of rollers, one flat and the other comprising a structured surface. In this process, the pressure is supplied by passing a web of multi-layer article between the two rollers. A pair of such rollers is often referred to as a nip.

In some embodiments, it is possible to prepare embossed adhesive articles from raw materials in a continuous process. As described above, the multi-layer article comprising a substrate, adhesive layer and liner can be prepared by coextrusion. In this process, at least two or all three of the layers of the substrate, adhesive and liner materials can be coextruded and contacted to form the multi-layer article. For example the substrate and adhesive layers can be coextruded and the coextrusion output contacted to a moving web of release liner. In other embodiments, the substrate, adhesive and liner layer can be coextruded and contacted to each to form the multi-layer article. The moving multi-layer web can then be passed between a pair of rollers, one flat and the other structured to form the embossed article in a single continuous process.

The article formed by this process is a multi-layer article comprising a substrate an adhesive layer and a liner as described above. The articles comprise a substrate with a first major surface and a second major surface, an adhesive layer with a first major surface and a second major surface, where the first major surface of the adhesive layer is contacting the second major surface of the substrate, and a liner with a first major surface and a second major surface, where the first major surface of the liner is contacting the second major surface of the adhesive layer. The second major surface of the liner contains a plurality of concave structures that correspond to a plurality of concave structures in the second major surface of the adhesive layer, but the concave structures do not distort the second major surface of the substrate. In other words, a series of concave structures are present in the liner and continue into the adhesive layer, but do not continue into the substrate.

Depending upon the nature of the elements present in these articles, they can either be used as is, or can be used to form other adhesive articles. For example, the liner can be removed from the adhesive layer and the adhesive layer, which now contains a structured surface, can be laminated to a wide range of adherend surfaces to form articles. If the substrate is a release liner, the article is sometimes referred to as a "transfer tape" because the adhesive layer is a free-standing film adhered to two liners. When the release liner is removed from the transfer tape, the exposed adhesive surface can be laminated to a wide range of adherend surfaces. Examples of suitable adherend surfaces include a wide range of films and tape backings or a variety of rigid or semi-rigid adherends, such as the exterior surface of an article. The liner that has been embossed can then be removed to expose the structured adhesive surface and the structured adhesive surface can be laminated to the surface of an adherend. This adherend can be the same or different from the other adherend, for example, the transfer tape may be laminated to two films, to a film and a rigid substrate, or to two rigid substrates.

Typically, the structures formed in the adhesive layer by the process of embossing the adhesive layer through the liner are unstable as described above, but the structures do not immediately collapse, or do not completely collapse upon removal of the liner from the adhesive layer. If the structures immediately collapsed upon removal of the liner, the advantages of preparing a structured adhesive surface, such as air egress, would be lost. However, because the structures are unstable upon removal of the liner, it is desirable to laminate the adhesive layer to the desired adherend as soon as possible after removal of the liner. By the structures being unstable, it is meant that upon removal of the liner, the stresses built into the adhesive layer by the embossing process are removed and the adhesive layer begins to return to its original, flat configuration. It is generally desirable that the structures do collapse and disappear with time, especially if the adhesive is optically clear and is used in an optical application. The presence of uncollapsed structures in an optical construction is generally undesirable as the uncollapsed structures can adversely affect optical properties. Additionally, uncollapsed structures result in incomplete wet out of the adhesive layer to the adherend surface and can adversely affect adhesive properties. The time necessary for the structures to collapse will vary greatly depending upon the nature of the adhesive, the adherend and the processing conditions. For example, if the adhesive is a crosslinked pressure sensitive adhesive as described above, stress is built into the adhesive layer by the embossing process and this stress is relieved by the collapse of the structures and the return of the adhesive layer to a flat conformation. Even in non-crosslinked embodiments, some stresses are built into the adhesive layer, but the collapse of the structures may result primarily from adhesive flow. If desired, collapse of the structures can be accelerated through the application of pressure, heat or a combination thereof, but, as stated above this is not necessary as the collapse of the structures is a spontaneous process.

Additionally, as described above, the convex protrusions formed during the embossing process do not disappear with time. The presence of the convex protrusions, together with the presence of the uncollapsed concave structures, helps to make the adhesive layer initially repositionable or temporarily repositionable. The permanent presence of the convex protrusions also modifies the adhesion of the adhesive layer even after the concave structures have collapsed.

In FIG. 1, a cross section of multi-layer article 100 is shown which comprises substrate layer 110, adhesive layer 120, and liner 130. Adhesive layer 120 is shown as a continuous layer, but as described above this layer can comprise a discontinuous layer, or a stripe coated layer, etc. The interface between the adhesive layer 120 and liner 130 is designated as 135.

Figure 2:
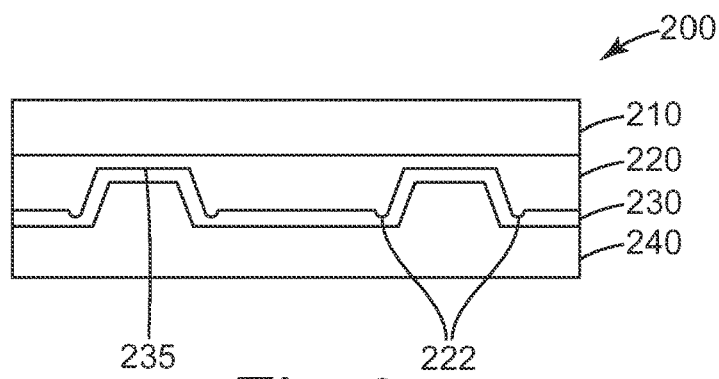
FIG. 2 shows a cross sectional view of the multi-layer adhesive article of FIG. 1 contacted to a structured embossing tool, according to one embodiment of this disclosure.

FIG. 2 shows a cross section of multi-layer article 200, which is article 100 which has been embossed by embossing tool 240, with substrate layer 210, adhesive layer 220, and liner 230. The structures of embossing tool 240 deform liner 230 and adhesive layer 220 as shown by the liner/adhesive interface 235, but the deformation of the tool structures does not deform substrate 210. Convex protrusions 222 form adjacent to the deformations of the tool structures.

Figure 3:
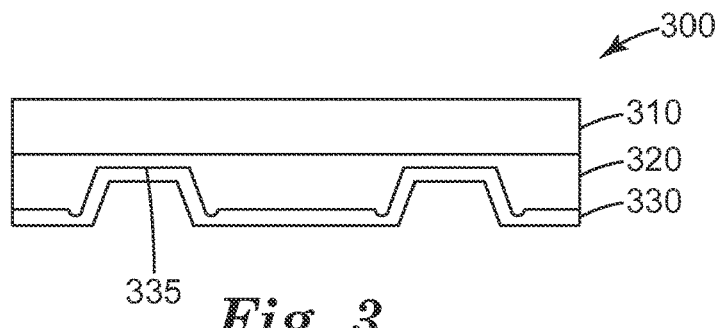
FIG. 3 shows a cross sectional view of the multi-layer adhesive article of FIG. 2 upon removal of the structured tool, according to one embodiment of this disclosure.

FIG. 3 shows a cross section of multi-layer article 300, which is article 200 from which embossing tool 240 has been removed, with substrate layer 310, adhesive layer 320, and liner 330. The deformed liner 330 and deformed adhesive layer 320 retain the deformation upon removal of embossing tool with the liner/adhesive interface 335.

Figure 4:
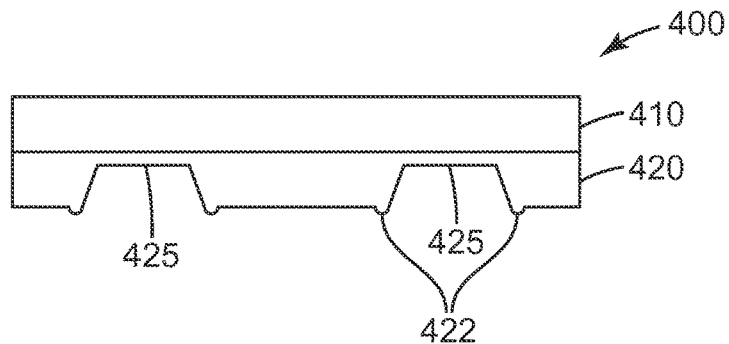
FIG. 4 shows a cross sectional view of the multi-layer adhesive article of FIG. 3, wherein the liner has been removed, according to one embodiment of this disclosure.

FIG. 4 shows a cross section of multi-layer article 400, which is article 300 from which liner 330 has been removed, with substrate layer 410, and adhesive layer 420. The structures of deformed adhesive layer 420 are retained immediately after removal of liner 330. Surfaces 425 are the bottom surfaces of the adhesive layer where the embossed structuring has occurred. Convex protrusions 422 are adjacent to the deformations of the tool structures.

Figure 5:
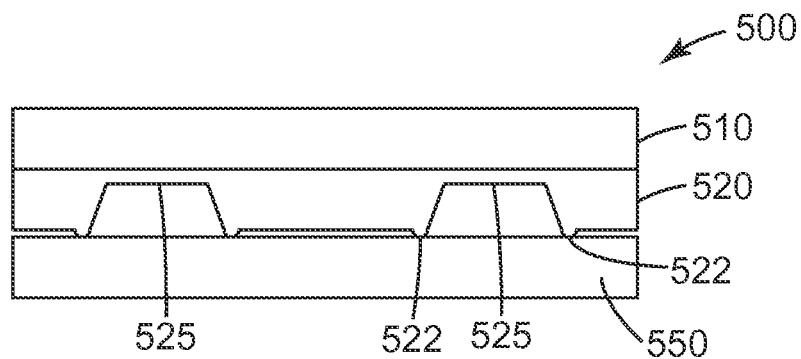
FIG. 5 shows a cross sectional view of the multi-layer adhesive article of FIG. 4 wherein the structured adhesive surface is contacted to an adherend, according to one embodiment of this disclosure.

FIG. 5 shows a cross section of multi-layer article 500, which is article 400 which has been laminated to substrate layer 550, with substrate layer 510, and adhesive layer 520. Surfaces 525 are the bottom surfaces of the adhesive layer where the embossed structuring has occurred, and show that the structuring is retained immediately after lamination to substrate 550. Convex protrusions 522 are adjacent to the deformations of the tool structures.

Figure 6:
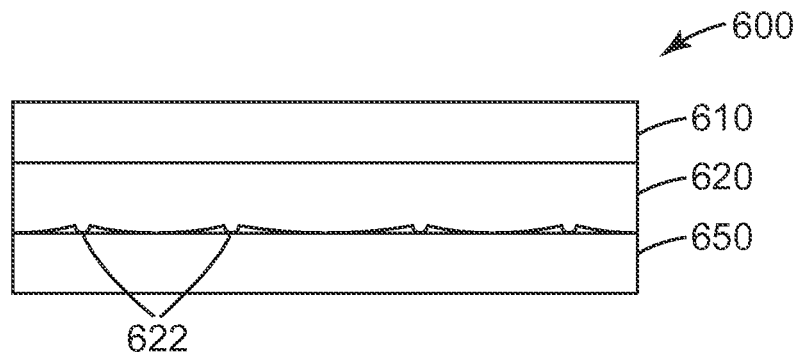
FIG. 6 shows a cross sectional view of a multi-layer adhesive article according to one embodiment of this disclosure.

FIG. 6 shows a cross section of multi-layer article 600, which is article 500 at a later time, with substrate layer 610, adhesive layer 620, and substrate layer 650, demonstrating the embossed structuring in adhesive layer 520 shown as surfaces 525 of FIG. 5, have collapsed and disappeared to form essentially flat adhesive layer 620, except for convex protrusions 622.

EXAMPLES

Samples were made and tested showing that an adhesive can be structured such that portions of the structures are permanent and other portions are temporary upon use. These examples are merely for illustrative purposes only and are not meant to be limiting on the scope of the appended claims.

Test Methods

Wet Out Fraction

Samples were tested to show the change in adhesive wet out on a surface over time. The liner was removed from the samples. The samples were hand laminated to a clean glass slide and a time series of pictures were recorded through the glass on an optical microscope with 5× magnification, imaging the adhesive/glass interface. Images of the interface were captured as the structures changed shape and the adhesive wet the surface of the glass. Tests were run at ambient conditions. Image analysis was performed using MATLAB available from The MathWorks, Inc. Natick, Mass. The analysis applied a Savitzky-Golay smoothing filter and then a threshold mask to the image. Light areas on the image correspond to air between the adhesive and the glass. Dark areas show where the adhesive has wet the glass surface. Each pixel of the image was given a value of 1 for pixel brightness above the threshold and 0 for below. The sum of the pixels with a value of 1 was divided by the total number of pixels. The Wet Out Fraction is one minus this sum.

Peel Force

90° Peel Adhesion

90° peel adhesion tests were conducted by adapting the method in ASTM D3330-90. Adhesive coatings were cut to 2.54 centimeter by 15 centimeter strips. Each strip was then adhered to a 6.2 centimeter by 23 centimeter clean, solvent washed glass panel using a 0.5-kilogram roller. The bonded assembly dwelled at room temperature for no less than 10 minutes and no more than 15 minutes. The samples were tested for 90° peel adhesion using an IMASS slip/peel tester with a 90° peel testing assembly (Model SP2000, commercially available from Instrumentors Inc., Strongsville, Ohio) at a rate of 0.8 meters/minute (30 inches/minute) over a ten second data collection time. Three samples were tested; the reported peel adhesion value is an average of the peel adhesion value from each of the three samples. Data was measured in grams/inch width and converted to Newtons per decimeter (N/dm).

EXAMPLES

Example 1

A length of multi-layer film (as described is US patent Publication No. 2011/0316203 (Emslander et al.)) was obtained. It consisted of a print receptor layer 25 micrometers thick (1 mil), a core HDPE layer 69 micrometers thick (2.7 mil), a tie adhesion layer 5 micrometers thick (0.2 mil), an acrylic adhesive layer 18 micrometers thick (0.7 mil), a polyolefin block copolymer release layer 13 micrometers thick (0.5 mil), and a HDPE liner 84 micrometers thick (3.3 mil). The print receptor layer is described in PCT Patent Publication No. WO 2011/091132 (Dennison et al.).

Figure 7:
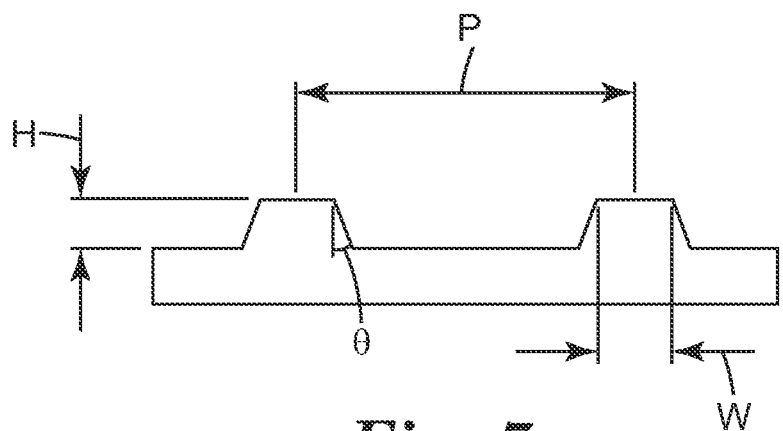
FIG. 7 shows a cross sectional view of an embossing tool used in Example 1.

The multi-layer film was embossed in a nip under a pressure of 43.8 kN/cm (250 pounds per lineal inch) between a metal shim covered rubber nip roll and a tool roll at a temperature of 138° C. (280° F.). The tool roll was a nickel plated copper tool roll with tooling shown in FIG. 7. In FIG. 7, H (the height of structures) is 203 micrometers (8 mils); W (the width of structures) is 102 micrometers (4 mils); P (the pitch of the structures, which is the distance between the center of one structure and the center of its nearest neighbor) is 70 lines per 2.54 centimeters (70 lines per inch); and angle θ (the draft angle) is 10°. Embossing line speed was 15.24 m/min (50 ft/min). The tool was positioned against the liner side of the multilayer film.

The Wet Out Fraction for the embossed multilayer film was determined using the test method described above for two conditions: initial touch-down and after application of pressure to the sample. The liner was removed from the first sample, and the film was applied to the clean glass slide with only the weight of the roller (0.5 kg) during application. An image of the sample was taken through the clean glass slide within five minutes of application. The second sample was created by removing the liner from a second piece of the embossed multilayer film. The film was then laminated to the clean glass slide using hand pressure applied to the roller, and an initial image of the wet-out was collected. The samples were left at room temperature for three weeks, and the micrographs were collected from the same areas. Table 1 shows the Wet Out Fraction results over the 3 week time period.

TABLE 1

Wet Out Fraction over time

| Time | Low Application Pressure | High Application Pressure |
|---|---|---|
| 0, Initial | 0.21 | 0.43 |
| 3 Weeks | 0.67 | 0.67 |

The initial Peel Force for the embossed multilayer film was determined using the test method described above for two conditions: initial touch-down and after application of pressure to the sample. The liner was removed from the first sample, and the film was applied to a clean glass slide with only the weight of the roller during application. The second sample was created by removing the liner from a second piece of the embossed multilayer film. The film was then laminated to the glass slide using hand pressure applied to the roller.

A 2.54 cm (1 inch) wide ribbon was cut into the liner across the slide, and the sample was mounted in a peel tester in the 90 degree configuration. One end of the ribbon was attached to the clip of the peel tester. The results of the peel testing for three runs were averaged. The initial touch-down sample had an average peel of 5.33 N/dm, while the pressure adhered sample had a peel strength of 8.80 N/dm.

What is claimed is:

1. An article comprising:
    a substrate with a first major surface and a second major surface;
    an adhesive layer with a first major surface and a second major surface, wherein the first major surface of the adhesive layer is contacting the second major surface of the substrate, and wherein the adhesive layer comprises a mixture of adhesive components wherein the adhesive components have the same chemical composition but different topological properties; and
    a liner with a first major surface and a second major surface, wherein the first major surface of the liner is contacting the second major surface of the adhesive layer, and wherein the second major surface of the liner contains a plurality of concave distortions that correspond to a plurality of concave structures in the adhesive layer, and wherein the adhesive layer further comprises a plurality of convex structures adjacent to the concave structures, and
    wherein the concave distortions of the liner do not distort the second major surface of the substrate, wherein the concave structures in the adhesive layer, the convex structures in the adhesive layer, and the concave distortions in the liner are all formed simultaneously by the application of a structured tool applied to a multi-layer article comprising the substrate, adhesive layer, and liner, through the second major surface of the liner.

2. The article of claim 1, wherein the difference in topological properties of the adhesive components comprises a difference in viscoelastic response.

3. The article of claim 1, wherein the difference in topological properties comprises a difference in peel adhesion.

4. The article of claim 1, wherein the plurality of concave structures in the adhesive layer are unstable upon removal of the liner.

5. The article of claim 1, wherein the plurality of concave structures comprise a plurality of concave microstructures.

6. The article of claim 1, wherein the adhesive components comprise a pressure sensitive adhesive composition and a pressure sensitive adhesive composition which has been permanently topologically distorted.

7. The article of claim 1, wherein the convex structures comprise an adhesive composition which has been permanently topologically distorted.

8. The article of claim 1, wherein the substrate comprises a film, a tape backing, a graphic article, a plastic article, a wound dressing, a protection film or tape, or a release liner.

9. The article of claim 1, wherein the liner comprises a polymeric film, a coated polymeric film, or a coated paper sheet.

* * * * *